(12) United States Patent
Ryu

(10) Patent No.: US 11,336,144 B2
(45) Date of Patent: May 17, 2022

(54) MOTOR HAVING TERMINALS WITH UNIFIED SHAPES FOR POSITIONING

(71) Applicant: LG INNOTEK CO., LTD., Seoul (KR)

(72) Inventor: Woong Seon Ryu, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 16/959,285

(22) PCT Filed: Dec. 27, 2018

(86) PCT No.: PCT/KR2018/016753
§ 371 (c)(1),
(2) Date: Jun. 30, 2020

(87) PCT Pub. No.: WO2019/135549
PCT Pub. Date: Jul. 11, 2019

(65) Prior Publication Data
US 2021/0057955 A1 Feb. 25, 2021

(30) Foreign Application Priority Data
Jan. 5, 2018 (KR) .......................... 10-2018-0001648

(51) Int. Cl.
*H02K 3/51* (2006.01)
*H02K 1/14* (2006.01)
(Continued)

(52) U.S. Cl.
CPC ............... *H02K 3/51* (2013.01); *H02K 1/146* (2013.01); *H02K 1/165* (2013.01); *H02K 3/522* (2013.01); *H02K 11/00* (2013.01); *H02K 2203/09* (2013.01)

(58) Field of Classification Search
CPC .......... H02K 1/146; H02K 1/165; H02K 3/38; H02K 3/51; H02K 3/522; H02K 11/00; H02K 2203/09
(Continued)

(56) References Cited

U.S. PATENT DOCUMENTS 10,547,228 B2 * 1/2020 Kong ................... B62D 5/0403
2006/0138883 A1 * 6/2006 Yagai ..................... H02K 3/522
310/71
(Continued)

FOREIGN PATENT DOCUMENTS

CN 104467299 3/2015
EP 2 849 315 3/2015
(Continued)

OTHER PUBLICATIONS

European Search Report dated Jan. 13, 2021 issued in Application No. 18898421.5.
(Continued)

*Primary Examiner* — Rashad H Johnson
(74) *Attorney, Agent, or Firm* — KED & Associates LLP

(57) ABSTRACT

The present invention may provide a motor including a shaft, a rotor coupled to the shaft, a stator disposed outside the rotor, and a bus bar disposed on the stator, wherein the bus bar includes a terminal connected to a coil of the stator, the terminal includes a first terminal and a second terminal which are separated from each other in a circuit manner, the first terminal includes a first neutral terminal and a plurality of first phase terminals, the second terminal includes a second neutral terminal and a plurality of second phase terminals, first curvature centers of the plurality of first phase terminals are disposed to be different, second curvature centers of the plurality of second phase terminals are disposed to be different, and a position of a curvature center
(Continued)

of the first neutral terminal is the same as a position of a curvature center of the second neutral terminal.

12 Claims, 11 Drawing Sheets

(51) Int. Cl.
 *H02K 1/16* (2006.01)
 *H02K 11/00* (2016.01)
 *H02K 3/52* (2006.01)
(58) Field of Classification Search
 USPC .................................................. 310/71, 254.1
 See application file for complete search history.

(56) References Cited

U.S. PATENT DOCUMENTS

| | | | |
|---|---|---|---|
| 2010/0141067 A1 | 6/2010 | Kitagawa | |
| 2014/0015359 A1 | 1/2014 | Chamberlin et al. | |
| 2015/0076944 A1* | 3/2015 | Shim | H02K 3/28 |
| | | | 310/71 |
| 2016/0190887 A1* | 6/2016 | Sambuichi | H02K 3/38 |
| | | | 310/71 |
| 2017/0093239 A1 | 3/2017 | Teranishi et al. | |
| 2018/0316238 A1* | 11/2018 | Kong | H02K 3/522 |
| 2020/0127524 A1* | 4/2020 | Kong | H02K 3/28 |

FOREIGN PATENT DOCUMENTS

| | | |
|---|---|---|
| EP | 3 681 017 | 7/2020 |
| JP | 2013-102596 | 5/2013 |
| JP | 2013-201896 | 10/2013 |
| JP | 2017-070124 | 4/2017 |
| KR | 10-2017-0128718 | 11/2017 |
| WO | WO 2017/078455 | 5/2017 |

OTHER PUBLICATIONS

International Search Report dated Apr. 3, 2019 issued in Application No. PCT/KR2018/016753.
Chinese Office Action dated Jan. 29, 2022 issued in CN Application No. 201880085255.9.

* cited by examiner

[FIG. 1]
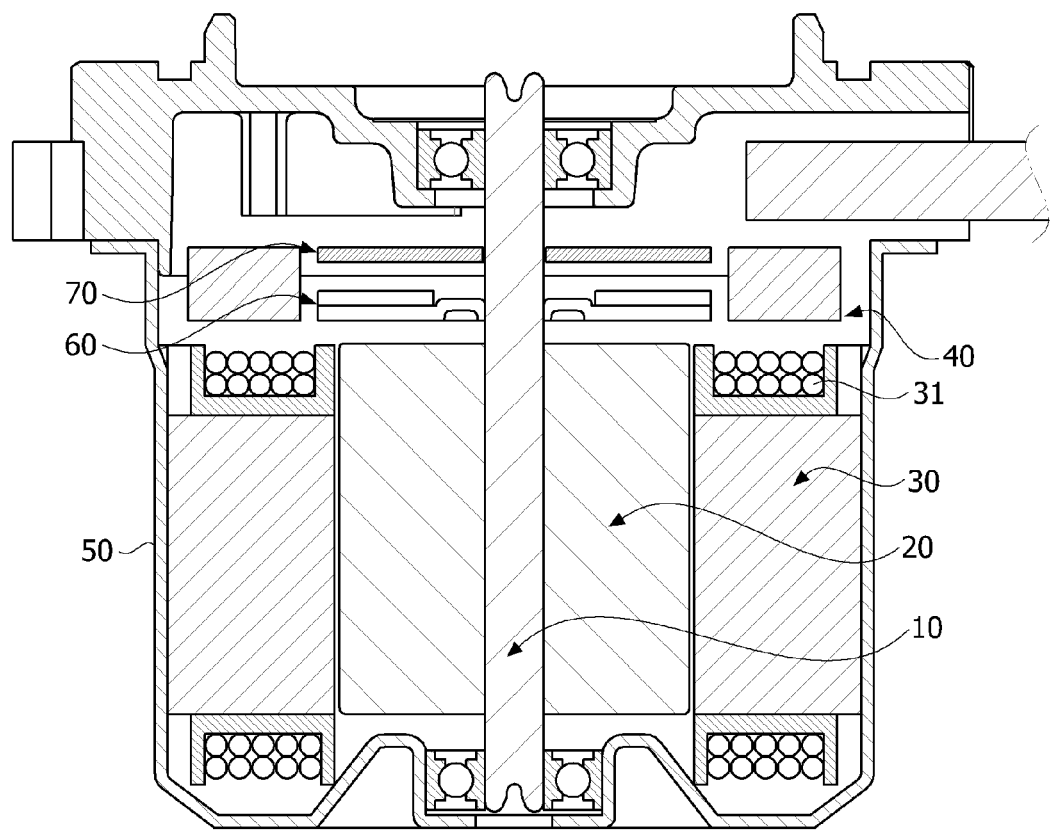

[FIG. 2]
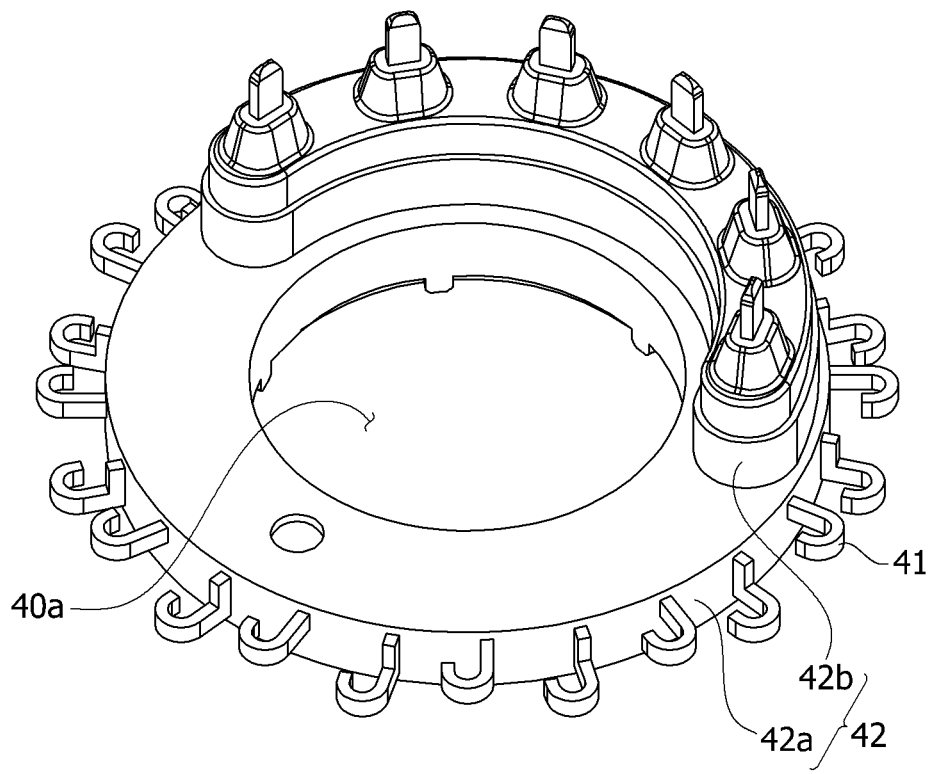

[FIG. 3]
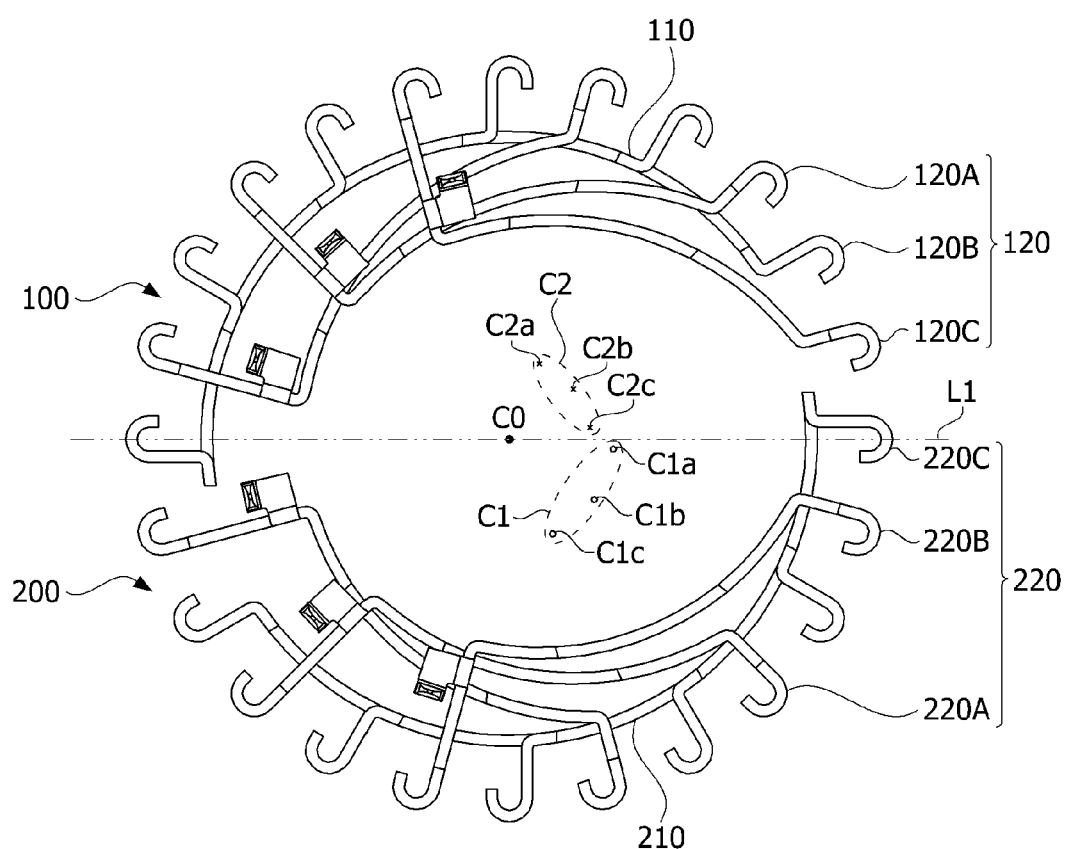

[FIG. 4]
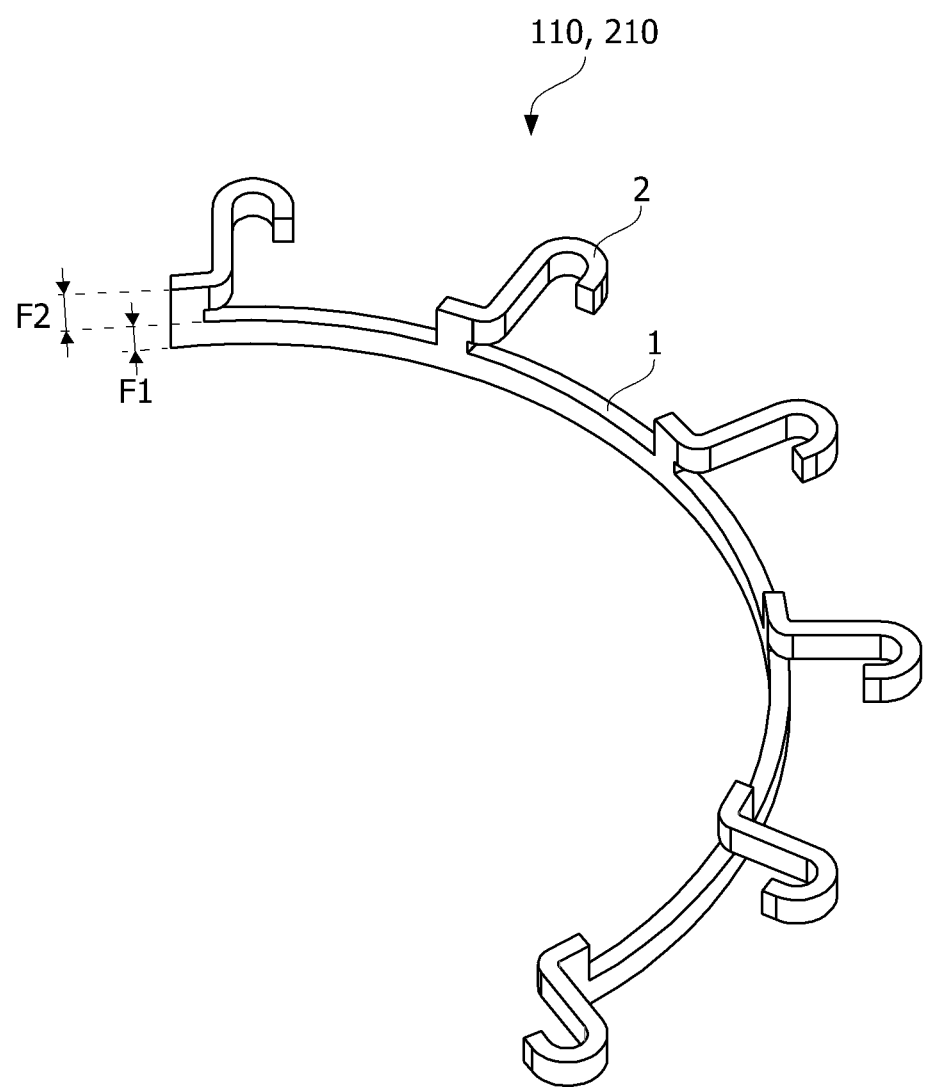

[FIG. 5]
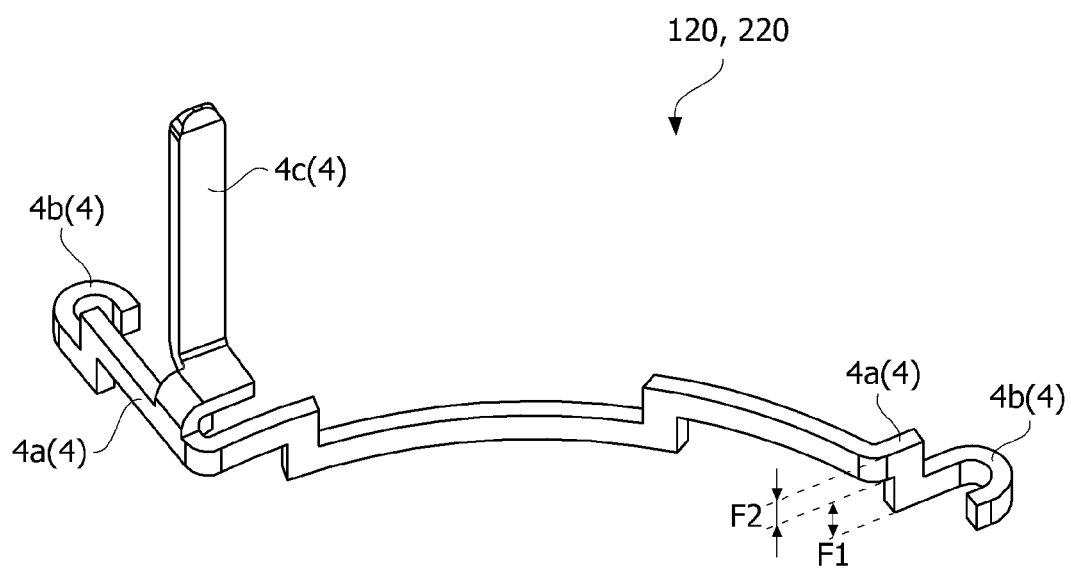

[FIG. 6]
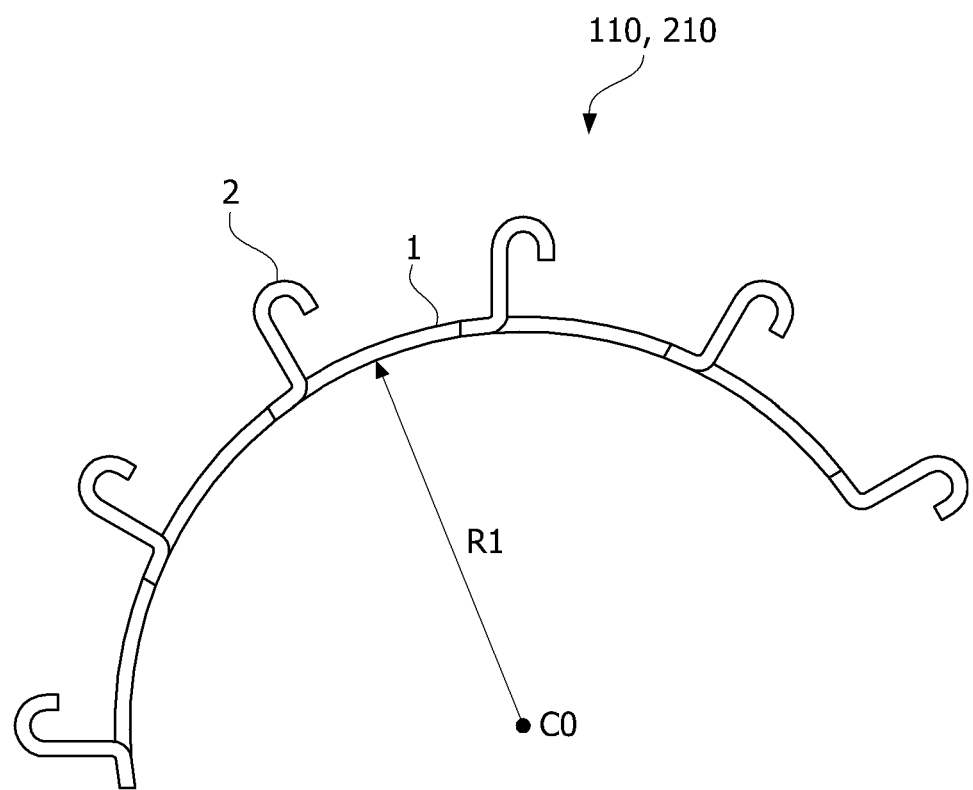

[FIG. 7]
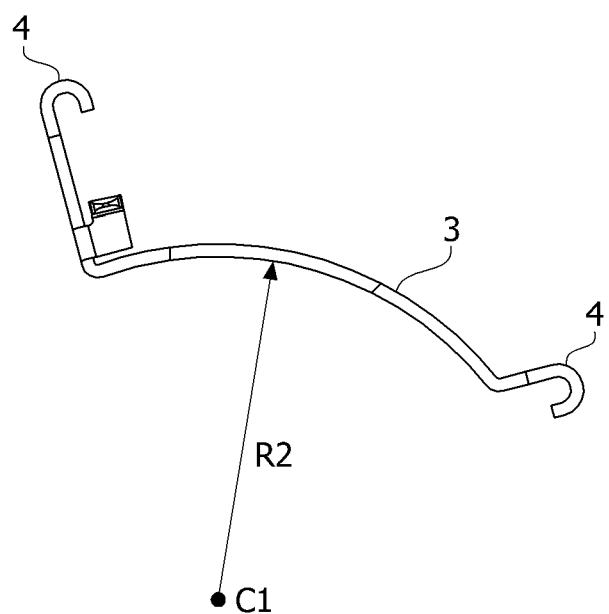

[FIG. 8]
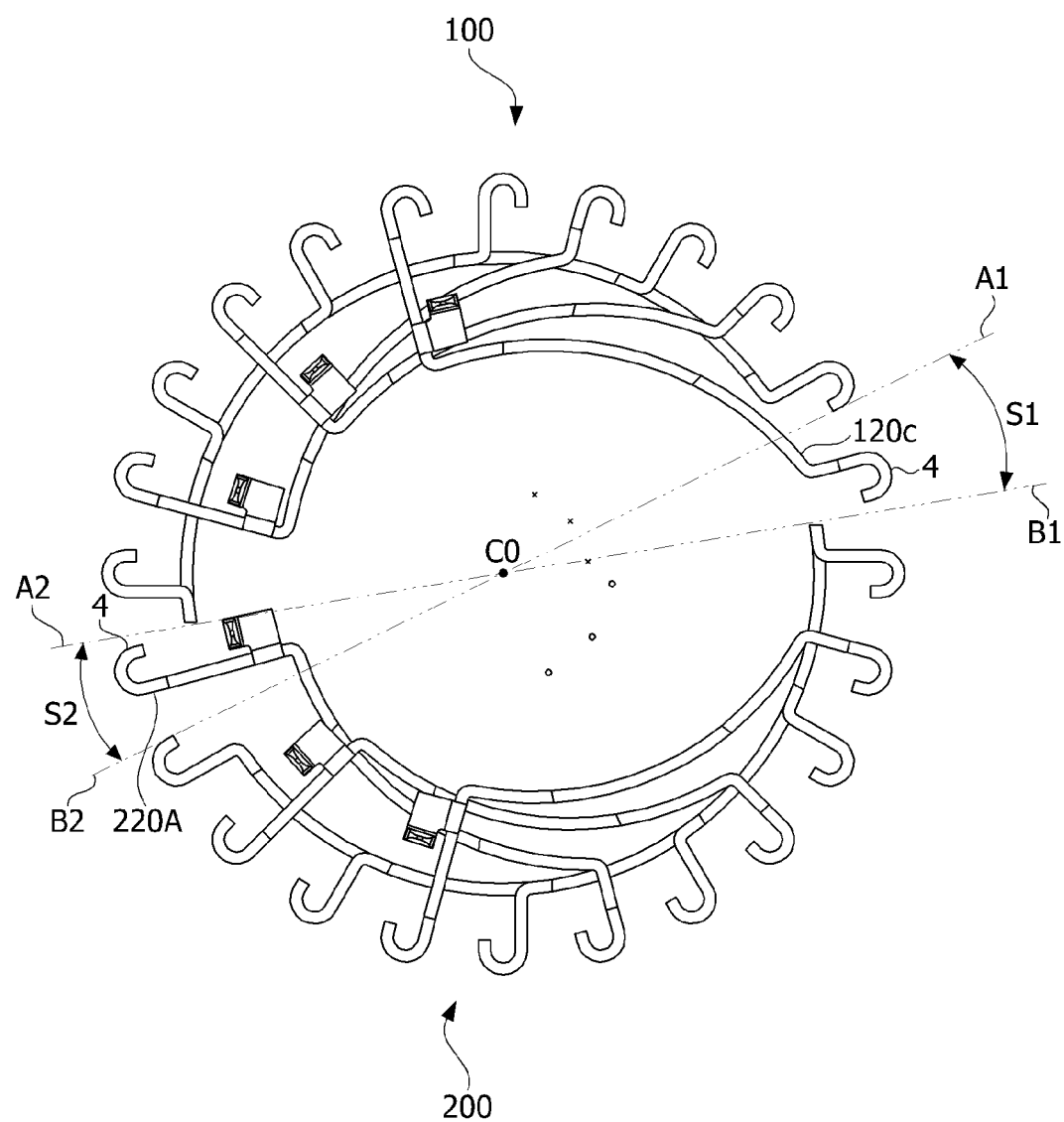

[FIG. 9]
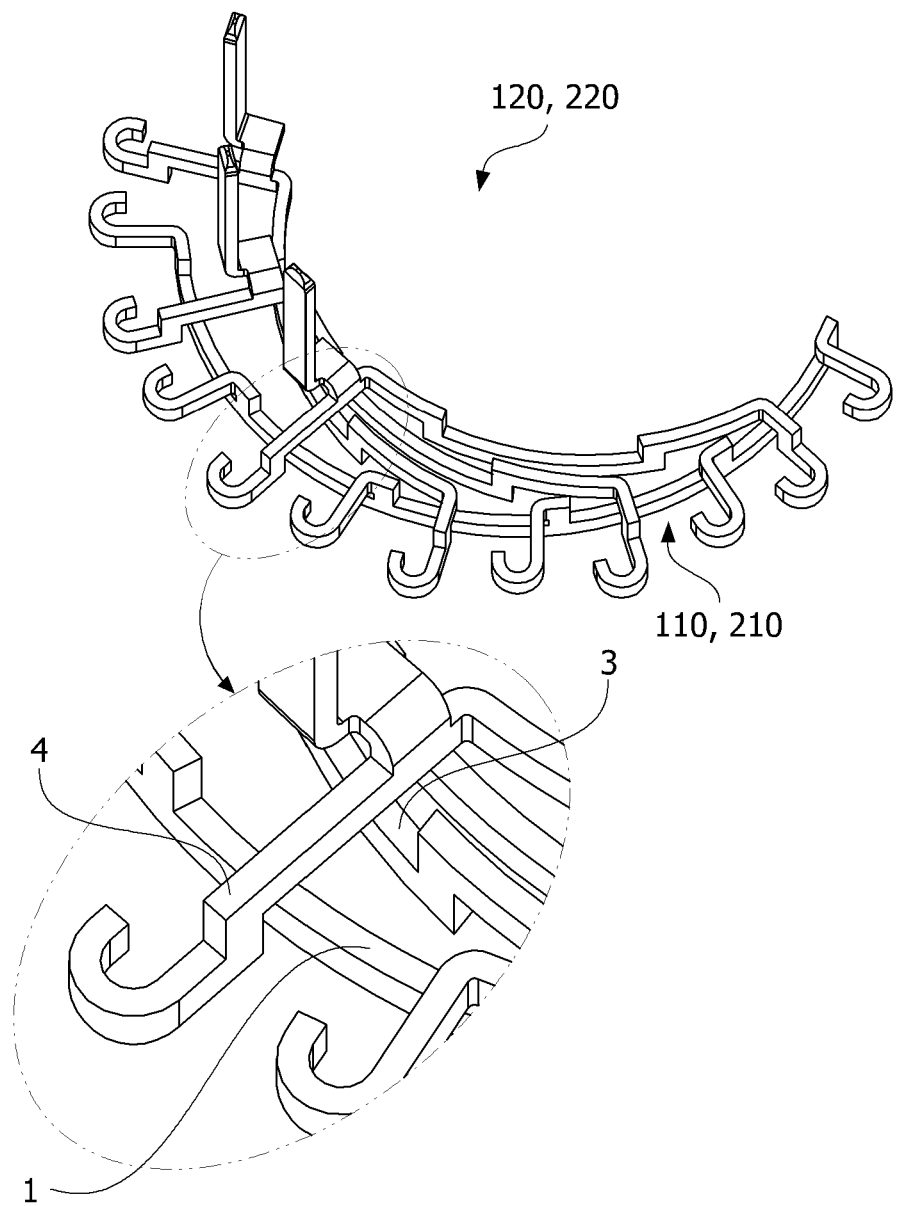

[FIG. 10]
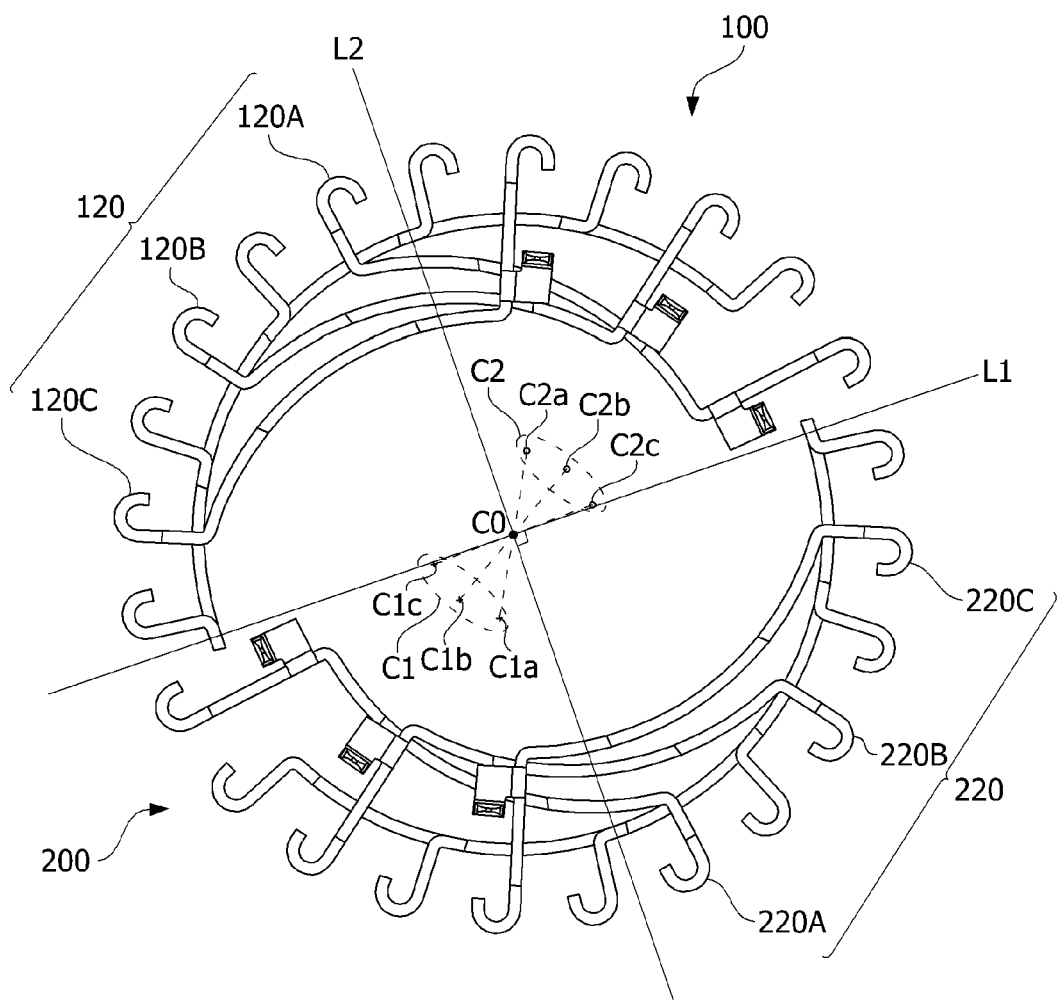

[FIG. 11]
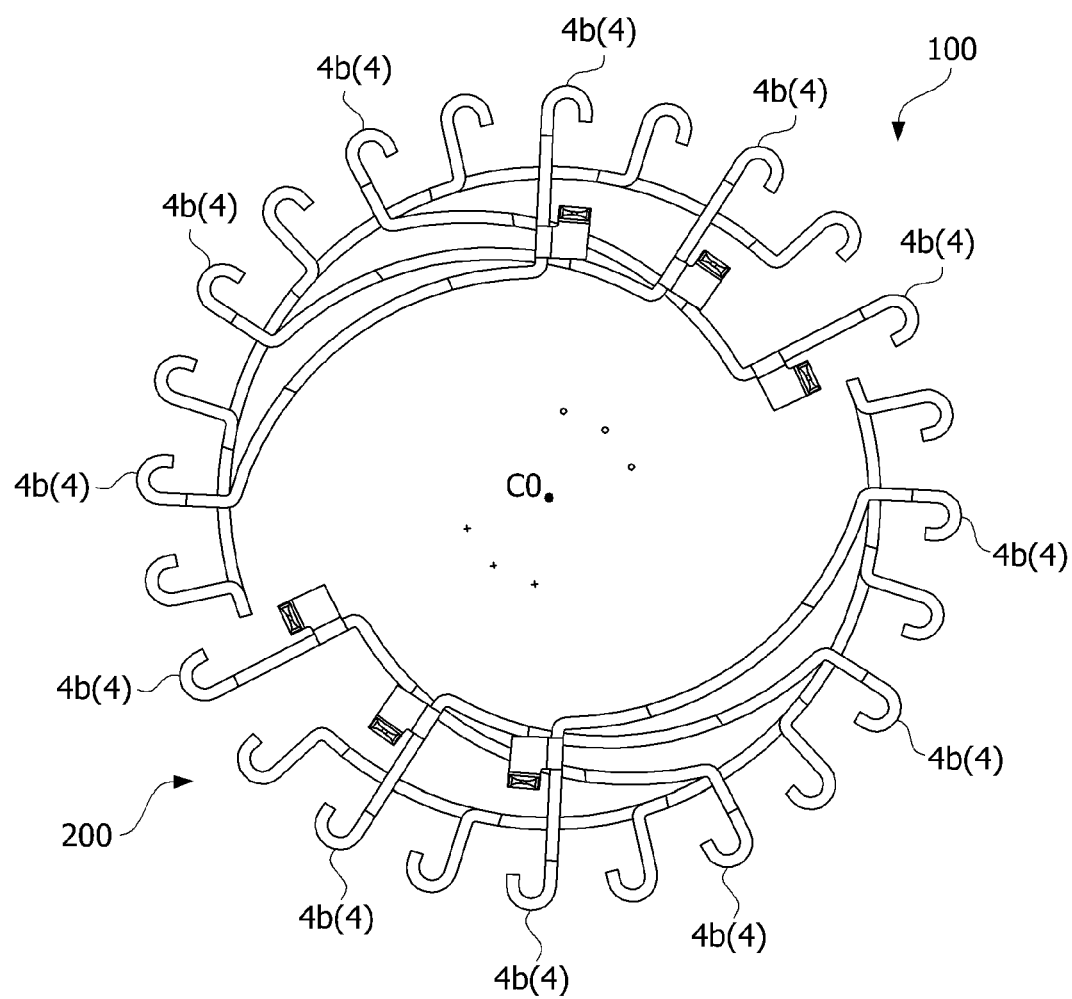

MOTOR HAVING TERMINALS WITH UNIFIED SHAPES FOR POSITIONING

CROSS-REFERENCE TO RELATED PATENT APPLICATIONS

This application is a U.S. National Stage Application under 35 U.S.C. § 371 of PCT Application No. PCT/KR2018/016753, filed Dec. 27, 2018, which claims priority to Korean Patent Application No. 10-2018-0001648, filed Jan. 5, 2018, whose entire disclosures are hereby incorporated by reference.

TECHNICAL FIELD

The present invention relates to a motor.

BACKGROUND ART

Electronic power steering (EPS) systems secure turning stability of vehicles and provide quick reinforcing force so that drivers can stably travel. An EPS system uses an electronic control unit (ECU) to drive a motor according to driving conditions detected by a speed sensor, a torque angle sensor, a torque sensor, and the like so as to control operation of a steering shaft of a vehicle.

A motor includes a rotor and a stator. A coil is wound around the stator. A connection end of the coil wound around the stator may be connected to a bus bar. The bus bar includes a body and a terminal. The terminal is connected to the connection end of the coil. In addition, the terminal may be connected to an external power source through a cable.

The terminal may be formed as a combination of phase terminals connected to U-phase, V-phase, and W-phase power sources and a neutral terminal connecting the phase terminals. In this case, two terminals combined as described above may be disposed and separated in a circuit to secure safety of a motor. In a case in which abnormality occurs in a circuit or element connected to any one terminal, the motor can be driven through the other terminal. The two terminals are spatially separated from bodies of the bus bar.

However, since connection ends of the terminals are disposed at equidistant intervals, terminals having various shapes may be required. In the case in which the terminals have various shapes, there are problems in that the number of molds is increased, a cost is increased, material loss is high, and a manufacturing process is complicated. In addition, during a process of injection-molding the bus bar, there are problems in that errors in position of two terminals may easily occur, and it is difficult to visually check whether a position of the neutral terminal or the phase terminal is correct.

Technical Problem

The present invention is directed to providing a motor in which shapes of terminals are unified, which allows correct positions of the terminals to be secured during a process of forming a bus bar, and which allows an assembly process to be simplified.

Objectives that should be solved according to embodiments are not limited to the above described objectives, and other objectives which are not described above will be clearly understood by those skilled in the art from the following specification.

Technical Solution

One aspect of the present invention provides a motor including a shaft, a rotor coupled to the shaft, a stator disposed outside the rotor, and a bus bar disposed on the stator, wherein the bus bar includes a terminal connected to a coil of the stator, the terminal includes a first terminal and a second terminal which are separated from each other in a circuit manner, the first terminal includes a first neutral terminal and a plurality of first phase terminals, the second terminal includes a second neutral terminal and a plurality of second phase terminals, first curvature centers of the plurality of first phase terminals are disposed to be different, second curvature centers of the plurality of second phase terminals are disposed to be different, and a position of a curvature center of the first neutral terminal is the same as a position of a curvature center of the second neutral terminal.

A position of the first curvature center may be different from a position of the second curvature center.

When a virtual line passing through the curvature center of the first neutral terminal is referred to as a first reference line and when a virtual line perpendicular to the first reference line and passing through the curvature center of the first neutral terminal is referred to as a second reference line, the first curvature center may be disposed at any one side of the first reference line, the second curvature center may be disposed at the other side of the first reference line, and the first curvature center and the second curvature center may be disposed at any one side of the second reference line.

When a virtual line passing through the curvature center of the first neutral terminal is referred to as a first reference line and when a virtual line perpendicular to the first reference line and passing through the curvature center of the first neutral terminal is referred to as a second reference line, the first curvature center may be disposed at any one side of the first reference line, the second curvature center may be disposed at the other side of the first reference line, the first curvature center may be disposed at any one side of the second reference line, and the second curvature center may be disposed at the other side of the second reference line.

The first curvature center and the second curvature center may be disposed to be rotationally symmetrical with respect to the curvature center of the first neutral terminal.

The first curvature center and the second curvature center may be disposed to be point-symmetrical with respect to the curvature center of the first neutral terminal.

Each of the first phase terminals and the second phase terminals may include a body and protruding portions bent from the body in a radial direction with respect to the curvature center of the first neutral terminal.

The first neutral terminal and the second neutral terminal may be disposed to be point-symmetrical with respect to the curvature center of the first neutral terminal.

Each of the first phase terminals and the second phase terminals may have a multilayer structure, and the protruding portion disposed on a second layer portion may be disposed to cross an upper side of the body disposed on a first layer portion.

When viewed in an axial direction, any one of the plurality of protruding portions disposed on any one of the plurality of first phase terminals may be disposed between one side end portion of the first neutral terminal and one side end portion of second neutral terminal, and any one of the plurality of protruding portions disposed on any one of the plurality of second phase terminals may be disposed between the other side end portion of the first neutral terminal and the other side end portion of the second neutral terminal.

The protruding portions may include a first end portion extending from the body in the radial direction, a second end portion protruding from the first end portion and electrically connected to the coil of the stator, and a third end portion branched off from the second end portion and electrically connected to a power cable.

Each of the first phase terminals and the second phase terminals may include a body and a protruding portion bent from the body in a radial direction with respect to the curvature center of the first neutral terminal, wherein the protruding portion may include a first end portion extending from the body in the radial direction, a second end portion protruding from the first end portion and electrically connected to the coil of the stator, and a third end portion branched off from the second end portion and electrically connected to a power cable, and the second end portion of the first phase terminal and the second end portion of the second phase terminal may be disposed to be rotationally symmetrical with respect to the first curvature center.

Advantageous Effects

According to embodiments, since terminals having the same shape are combined and formed to be connected to two divided circuits, advantageous effects are provided in that correct positions of the terminals are secured during a process of forming a bus bar, and an assembly process is simplified.

Although the plurality of terminals have the same shape, it is easy to arrange protruding portions of the terminals at equidistant intervals, and thus an advantageous effect of improving insulation stability is provided.

DESCRIPTION OF DRAWINGS

FIG. 1 is a side cross-sectional view illustrating a motor according to an embodiment.

FIG. 2 is a perspective view illustrating a bus bar illustrated in FIG. 1.

FIG. 3 is a view illustrating a terminal of the bus bar illustrated in FIG. 2.

FIG. 4 is a view illustrating a neutral terminal illustrated in FIG. 3.

FIG. 5 is a view illustrating a phase terminal illustrated in FIG. 3.

FIG. 6 is a view illustrating a curvature center of the neutral terminal.

FIG. 7 is a view illustrating a curvature center of the phase terminal.

FIG. 8 is a plan view of terminals to illustrate a position of a protruding portion of the phase terminal.

FIG. 9 is an enlarged view illustrating the terminal illustrated in FIG. 3.

FIG. 10 is a view illustrating a modified example of the terminal of the bus bar illustrated in FIG. 2.

FIG. 11 is a view illustrating a first phase terminal and a second phase terminal which are rotationally symmetrical in the terminal illustrated in FIG. 10.

MODES OF THE INVENTION

Hereinafter, exemplary embodiments of the present invention will be described with reference to the accompanying drawings in detail. Purposes, specific advantages, and novel features of the invention will be made clear from the exemplary embodiments and the following detailed description in connection with the accompanying drawings. In the description of the invention, when it is determined that detailed descriptions of related well-known functions unnecessarily obscure the gist of the invention, the detailed descriptions thereof will be omitted.

It will be understood that, although the terms "first," "second," etc. may be used herein to describe various elements, these elements should not be limited by these terms. These terms are only used to distinguish one element from another. For example, a first element could be termed a second element, and a second element could similarly be termed a first element without departing from the scope of the present invention. As used herein, the term "and/or" includes combinations or any one of a plurality of associated listed items.

FIG. 1 is a side cross-sectional view illustrating a motor according to an embodiment.

Referring to FIG. 1, the motor according to the embodiment may include a shaft 10, a rotor 20, a stator 30, and a bus bar 40.

The shaft 10 may be coupled to the rotor 20. When a current is supplied, an electrical interaction occurs between the rotor 20 and the stator 30, the rotor 20 is rotated, and the shaft 10 is rotated in conjunction with the rotor. The shaft 10 may be connected to a steering shaft of a vehicle and may transmit power to the steering shaft.

The rotor 20 is rotated due to the electrical interaction with the stator 30.

The rotor 20 may include a rotor core and a magnet. The rotor core may be formed to have a shape in which a plurality of circular steel plates are stacked or formed to have one cylindrical shape. A hole to which the shaft 10 is coupled may be disposed at a center of the rotor core. A protrusion for guiding the magnet may protrude from an outer circumferential surface of the rotor core. The magnet may be attached to the outer circumferential surface of the rotor core. A plurality of magnets may be disposed along a circumference of the rotor core at predetermined intervals. The rotor 20 may include a can member which fixedly surrounds the magnets so that the magnets are not separated from the rotor core and the magnets are prevented from being exposed.

Coils 31 may be wound around the stator 30 to induce an electrical interaction with the rotor 20. A specific structure of the stator 30 around which the coils 31 are wound will be described below. The stator 30 may include a stator core including a plurality of teeth. An annular yoke portion is provided and the teeth around which a coil is wound from a yoke toward a center thereof may be provided in the stator core. The teeth may be provided along an outer circumferential surface of the yoke portion at predetermined intervals. Meanwhile, the stator core may be provided as a plurality of thin steel plates being stacked. In addition, the stator core may be provided as a plurality of divided cores being coupled or connected.

The bus bar 40 may be disposed on the stator 30. The bus bar 40 may include a terminal in a body having an annular shape. In addition, the terminal of the bus bar 40 may include phase terminals connected to U-phase, V-phase, and W-phase power sources and a neutral terminal connecting the phase terminals.

A housing 50 may accommodate the rotor 20 and the stator 30 therein.

A sensing magnet 60 is coupled to the shaft 10 to operate in conjunction with the rotor 20. The sensing magnet 60 is an apparatus configured to detect a position of the rotor 20.

A sensor configured to detect a magnetic force of the sensing magnet 60 may be disposed on a printed circuit board 70. In this case, the sensor may be a Hall integrated circuit (IC). The sensor detects a change in N-pole and S-pole of the sensing magnet 60 and generates a sensing signal.

FIG. 2 is a perspective view illustrating the bus bar illustrated in FIG. 1.

Referring to FIG. 2, the bus bar 40 includes terminals 41 and a body 42. The body 42 is a molding part formed through an injection molding process. The body 42 includes a hole 40a in a central portion thereof. The terminal 41 is disposed in the body 42, and a part of an end portion of the terminal 41 is disposed to be exposed from the body 42. The body 42 may substantially have an annular shape. The body 42 may have a structure having a plurality of layers. For example, the body 42 may have a form in which a second layer portion 42b is stacked on a part of an upper surface of a first layer portion 42a.

FIG. 3 is a view illustrating the terminals of the bus bar illustrated in FIG. 2, FIG. 4 is a view illustrating the neutral terminal illustrated in FIG. 3, and FIG. 5 is a view illustrating the phase terminal illustrated in FIG. 3.

Referring to FIGS. 1 to 3, the terminals 41 may include a first terminal 100 and a second terminal 200. The first terminal 100 and the second terminal 200 are connected to the coils 31 of the stator 30 but separated from each other in a circuit manner. In addition, the first terminal 100 and the second terminal 200 are spatially separated and disposed.

The first terminal 100 may include one first neutral terminal 110 and three first phase terminals 120. The three first phase terminals 120 are connected to phases (U-phase, V-phase, and W-phase) of a three-phase power source. The second terminal 200 may also include one second neutral terminal 210 and three second phase terminals 220. The three second phase terminals 220 are connected to the phases (U-phase, V-phase, and W-phase) of the three-phase power source. The three first phase terminals 120 and the three second phase terminals 220 have the same shape. Accordingly, the first and second phase terminals 120 and 220 may be manufactured using one mold. In addition, the first neutral terminal 110 and the second neutral terminal 210 have the same shape. The first and second neutral terminals 110 and 210 may also be manufactured using one mold. Since the first terminal 100 and the second terminal 200 have the same shape and the phase terminals have the same shape, there are advantages in that a manufacturing process is simple and a manufacturing cost is reduced.

Referring to FIG. 4, each of the first and second neutral terminals 110 and 210 may include a body 1 and protruding portions 2. The body 1 and the protruding portions 2 may only be distinguished and described according to shapes and functional properties and may be vertically connected as one member.

The body 1 is a belt type member having a curved surface. The first and second neutral terminals 110 and 210 are relatively longer than the first and second phase terminals 120 and 220. The protruding portion 2 is formed to extend from the body 1 in a radial direction with respect to a center (a curvature center C0 of the first neutral terminal 110) of the bus bar 40. Each of the first and second neutral terminals 110 and 210 may have a multilayer structure. The body 1 may be positioned on a first layer portion F1 of each of the first and second neutral terminals 110 and 210. The protruding portion 2 may be positioned on a second layer portion F2 of each of the first and second neutral terminals 110 and 210. The protruding portion 2 is electrically connected to the coil 31 (see FIG. 1) of the stator 30 (see FIG. 1). The protruding portion 2 may be fused to the coil 31 of the stator 30.

Referring to FIG. 5, each of the first and second phase terminals 120 and 220 may include a body 3 and protruding portions 4. The body 3 and the protruding portions 4 may only be distinguished and described according to shapes and functional properties and may be vertically connected as one member.

The body 3 is a belt type member having a curved surface. The first and second phase terminals 120 and 220 are relatively shorter than the first and second neutral terminals 110 and 210. The protruding portions 4 may include first end portions 4a, second end portions 4b, and a third end portion 4c. The first end portion 4a may be formed to extend from the body 3 in the radial direction with respect to the center (the curvature center C0 of the first neutral terminal 110) of the bus bar 40. The second end portion 4b protrudes from the first end portion 4a. An end of the second end portion 4b is bent in a hook shape to be connected to the coil 31 (see FIG. 1) of the stator 30 (see FIG. 1). The second end portion 4b may be fused to the coil 31 (see FIG. 1) of the stator 30 (see FIG. 1). The third end portion 4c may be branched off upward from the first end portion 4a. The third end portion 4c is electrically connected to a power cable. Each of the first and second phase terminals 120 and 220 may have the multilayer structure. A part of the body 3 and the second end portion 4b may be positioned on the first layer portion F1 of each of the first and second phase terminals 120 and 220. Another part of the body 3 and the first end portion 4a may be positioned on the second layer portion F2 of each of the first and second phase terminals 120 and 220.

FIG. 6 is a view illustrating a curvature center of the neutral terminal, and FIG. 7 is a view illustrating a curvature center of the phase terminal.

Referring to FIG. 6, the curvature center C0 of each of the first and second neutral terminals 110 and 210 corresponds to a center of a virtual circle extending from an inner circumferential surface of the body 1 and having a radius R1. Referring to FIG. 7, first and second curvature centers C1 and C2 of the first and second phase terminals 120 and 220 correspond to centers of vertical circles extending from inner circumferential surfaces of the bodies 3 and having radiuses R2.

Referring to FIGS. 3 to 6, the first curvature center C1 of the first phase terminal 120 is different from the second curvature center C2 of the second phase terminal 220. In addition, the curvature center C0 of the first neutral terminal 110 is the same as the curvature center C0 of the second neutral terminal 210. In addition, positions of curvature centers C1a, C1b, and C1c of three first phase terminals 120A, 120B, and 120C of the first terminal 100 are different. In addition, positions of curvature centers C2a, C2b, and C2c of three second phase terminals 220A, 220B, and 220C of the second terminal 200 are also different. This is to arrange and place six phase terminals having the same shape and the protruding portions 2 and 4 of two neutral terminals having the same shape in a circumferential and radial direction of the bus bar 40.

Specifically, a position of the first curvature center C1 may be distinguished from a position of the second curvature center C2 on the basis of a first reference line L1 passing through the curvature center C0 of the first and second neutral terminals 110 and 210. For example, the first terminal 100 and the second terminal 200 may be disposed such that the first curvature center C1 is positioned at any one side of the first reference line L1 and the second curvature center C2 is positioned at the other side of the first reference line L1. In this case, the positions of the curvature centers C1a, C1b, and C1c of the three first phase terminals 120A, 120B, and 120C are different. In addition, the positions of the curvature centers C2a, C2b, and C2c of the three second phase terminals 220A, 220B, and 220C are also different.

Curvature radiuses of three first phase terminals 120A, 120B, and 120C are the same but the positions of the curvature centers C1a, C1b, and C1c are different. The positions of the curvature centers C1a, C1b, and C1c are determined such that the protruding portions 4 of the three first phase terminals 120A, 120B, and 120C are aligned with the protruding portions 2 of the first neutral terminal 110 in the circumferential and radius directions of the bus bar 40.

In addition, curvature radiuses of the three second phase terminals 220A, 220B, and 220C are also the same but the positions of the curvature centers C2a, C2b, and C2c are different. The positions of the curvature centers C2a, C2b, and C2c are determined such that the protruding portions 4 of the three second phase terminals 220A, 220B, and 220C are aligned with the protruding portions 2 of the second neutral terminal 210 in the circumferential and radius directions of the bus bar 40.

Meanwhile, the first neutral terminal 110 and the second neutral terminal 210 may be disposed to be rotationally symmetrical with respect to the curvature center C0 of the first neutral terminal 110. For example, the first neutral terminal 110 and the second neutral terminal 210 may be disposed to be point-symmetrical with respect to the curvature center C0 of the first neutral terminal 110 such that any one of the first neutral terminal 110 and the second neutral terminal 210 overlaps the other one when rotating 180°.

FIG. 8 is a plan view of the terminals to illustrate the position of the protruding portion of the phase terminal.

Referring to FIG. 8, a line A1 of FIG. 8 is a reference line connecting one side end portion of the first neutral terminal 110 and the curvature center C0 of the first neutral terminal 110, and a line A2 of FIG. 8 is a reference line connecting the other side end portion of the first neutral terminal 110 and the curvature center C0 of the first neutral terminal 110.

In addition, a line B1 of FIG. 8 is a reference line connecting one side end portion of the second neutral terminal 210 and the curvature center C0 of the first neutral terminal 110, and a line B2 of FIG. 8 is a reference line connecting the other side end portion of the second neutral terminal 210 and the curvature center C0 of the first neutral terminal 110.

Any one of the protruding portions 4 of the first phase terminals 120A, 120B, and 120C, for example, the protruding portion 4 disposed at an outermost side among the protruding portions 4 of the first phase terminals 120A, 120B, and 120C, may be disposed in a region S1 corresponding to a region between the lines A1 and B1 on the basis of the circumferential direction of the bus bar 40.

In addition, any one of the protruding portions 4 of the second phase terminals 220A, 220B, and 220C, for example, the protruding portion 4 disposed at an outermost side among the protruding portions 4 of the second phase terminals 220A, 220B, and 220C, may be disposed in a region S2 corresponding to a region between the lines A2 and B2 on the basis of the circumferential direction of the bus bar 40.

This is to align the protruding portions 2 (see FIG. 4) of the first and second neutral terminals 110 and 210 with the protruding portions 4 (see FIG. 4) of the first and second phase terminals 120 and 220 in the circumferential and radial directions of the bus bar 40.

FIG. 9 is an enlarged view illustrating the terminal illustrated in FIG. 3.

Referring to FIGS. 4, 5, and 9, each of the first phase terminal 120 and the second phase terminal 220 has the multilayer structure. The following description will be given on the basis of the first phase terminal 120. The protruding portion 4 disposed on the second layer portion F2 of the first phase terminal 120 is disposed to cross an upper side of the body 3 disposed on the first layer portion F1 of the other first phase terminal 120 or an upper side of the body 1 disposed on the first layer portion F1 of the first neutral terminal 110. This is so the plurality of phase terminals do not overlap each other or the phase terminals do not overlap the neutral terminals at intersections.

FIG. 10 is a view illustrating a modified example of the terminals of the bus bar illustrated in FIG. 2.

Referring to FIG. 10, in terminals 41 according to the modified example, a position of a first curvature center C1 may be distinguished from a position of a second curvature center C2 on the basis of a first reference line L1 passing through a curvature center C0 of first and second neutral terminals 110 and 210. For example, a first terminal 100 and a second terminal 200 may be disposed such that the first curvature center C1 is positioned at any one side of the first reference line L1 and the second curvature center C2 is disposed at the other side of first reference line L1.

In addition, the position of the first curvature center C1 may be distinguished from the position of the second curvature center C2 on the basis of a second reference line L2 which passes through the curvature center C0 of the first and second neutral terminals 110 and 210 and is perpendicular to the first reference line L1. For example, the first terminal 100 and the second terminal 200 may be disposed such that the first curvature center C1 is positioned at one side of the second reference line L2 and the second curvature center C2 is positioned at the other side of the second reference line L2.

In this case, positions of curvature centers C1a, C1b, and C1c of three first phase terminals 120A, 120B, and 120C are different. In addition, positions of curvature centers C2a, C2b, and C2c of three second phase terminals 220A, 220B, and 220C are also different.

In addition, the first curvature center C1 and the second curvature center C2 may be disposed to be rotationally symmetrical with respect to the curvature center C0 of the first neutral terminal 110. For example, the first curvature center C1 and the second curvature center C2 may be point-symmetrical with respect to the curvature center C0 of the first neutral terminal 110 such that any one of the first curvature center C1 and the second curvature center C2 overlaps the other one when rotating 180°.

FIG. 11 is a view illustrating the first phase terminal and the second phase terminal which are rotationally symmetrical in the terminals illustrated in FIG. 10.

Referring to FIG. 11, in the terminals 41 according to the modified example, a first phase terminal 120 and a second phase terminal 220 may be disposed to be rotationally symmetrical with respect to the curvature center C0 of the first neutral terminal 110. For example, second end portions 4b of the first phase terminal 120 and second end portions 4b of the second phase terminal 220 are rotationally symmetrical.

The motor according to one exemplary embodiment of the present invention has been specifically described with reference to the accompanying drawings as described above.

The above-described embodiments should be considered in a descriptive sense only and not for purposes of limitation, and the scope of the present invention is defined not by the detailed description but by the appended claims. In addition, the scope of the present invention should be interpreted to encompass all modifications and alterations derived from meanings, the scope, and equivalents of the appended claims.

The invention claimed is:
1. A motor comprising:
a shaft;
a rotor coupled to the shaft;
a stator disposed outside the rotor; and
a bus bar disposed on the stator,
wherein the bus bar includes a terminal connected to a coil of the stator,
the terminal includes a first terminal and a second terminal which are separated from each other in a circuit manner,
the first terminal includes a first neutral terminal and a plurality of first phase terminals,
the second terminal includes a second neutral terminal and a plurality of second phase terminals,
first curvature centers of the plurality of first phase terminals are disposed to be different,
second curvature centers of the plurality of second phase terminals are disposed to be different, and
a position of a curvature center of the first neutral terminal is the same as a position of a curvature center of the second neutral terminal,
wherein, when a virtual line passing through the curvature center of the first neutral terminal is referred to as a first reference line and when a virtual line perpendicular to the first reference line and passing through the curvature center of the first neutral terminal is referred to as a second reference line:
the first curvature center is disposed at any one side of the first reference line;
the second curvature center is disposed at the other side of the first reference line;
the first curvature center is disposed at any one side of the second reference line; and
the second curvature center is disposed at the other side of the second reference line.

2. The motor of claim 1, wherein a position of the first curvature center is different from a position of the second curvature center.

3. The motor of claim 1, wherein the first curvature center and the second curvature center are disposed to be rotationally symmetrical with respect to the curvature center of the first neutral terminal.

4. The motor of claim 3, wherein the first curvature center and the second curvature center are disposed to be point-symmetrical with respect to the curvature center of the first neutral terminal.

5. The motor of claim 1, wherein each of the first phase terminals and the second phase terminals includes:
a body; and
protruding portions bent from the body in a radial direction with respect to the curvature center of the first neutral terminal.

6. The motor of claim 5, wherein the first neutral terminal and the second neutral terminal are disposed to be point-symmetrical with respect to the curvature center of the first neutral terminal.

7. The motor of claim 1, wherein each of the first phase terminals and the second phase terminals includes:
a body; and
a protruding portion bent from the body in a radial direction with respect to the curvature center of the first neutral terminal,
wherein the protruding portion includes a first end portion extending from the body in the radial direction, a second end portion protruding from the first end portion and electrically connected to the coil of the stator, and a third end portion branched off from the first end portion and electrically connected to a power cable, and
the second end portion of the first phase terminal and the second end portion of the second phase terminal are disposed to be rotationally symmetrical with respect to the first curvature center.

8. A motor comprising:
a shaft;
a rotor coupled to the shaft;
a stator disposed outside the rotor; and
a bus bar disposed on the stator,
wherein the bus bar includes a terminal connected to a coil of the stator,
the terminal includes a first terminal and a second terminal which are separated from each other in a circuit manner,
the first terminal includes a first neutral terminal and a plurality of first phase terminals,
the second terminal includes a second neutral terminal and a plurality of second phase terminals,
first curvature centers of the plurality of first phase terminals are disposed to be different,
second curvature centers of the plurality of second phase terminals are disposed to be different, and
a position of a curvature center of the first neutral terminal is the same as a position of a curvature center of the second neutral terminal,
wherein each of the first phase terminals and the second phase terminals includes:
a body; and
protruding portions bent from the body in a radial direction with respect to the curvature center of the first neutral terminal, wherein:
each of the first phase terminals and the second phase terminals has a multilayer structure; and
the protruding portion disposed on a second layer portion is disposed to cross an upper side of the body disposed on a first layer portion.

9. The motor of claim 8, wherein, when a virtual line passing through the curvature center of the first neutral terminal is referred to as a first reference line and when a virtual line perpendicular to the first reference line and passing through the curvature center of the first neutral terminal is referred to as a second reference line:
the first curvature center is disposed at any one side of the first reference line;
the second curvature center is disposed at the other side of the first reference line; and
the first curvature center and the second curvature center are disposed at any one side of the second reference line.

10. The motor of claim 8, wherein, when a virtual line passing through the curvature center of the first neutral terminal is referred to as a first reference line and when a virtual line perpendicular to the first reference line and passing through the curvature center of the first neutral terminal is referred to as a second reference line:
the first curvature center is disposed at any one side of the first reference line;
the second curvature center is disposed at the other side of the first reference line;
the first curvature center is disposed at any one side of the second reference line; and the second curvature center is disposed at the other side of the second reference line.

11. The motor of claim 8, wherein the protruding portions include:
- a first end portion extending from the body in the radial direction;
- a second end portion protruding from the first end portion and electrically connected to the coil of the stator; and
- a third end portion branched off from the first end portion and electrically connected to a power cable.

12. A motor comprising:
- a shaft;
- a rotor coupled to the shaft;
- a stator disposed outside the rotor; and
- a bus bar disposed on the stator,
- wherein the bus bar includes a terminal connected to a coil of the stator,
- the terminal includes a first terminal and a second terminal which are separated from each other in a circuit manner,
- the first terminal includes a first neutral terminal and a plurality of first phase terminals,
- the second terminal includes a second neutral terminal and a plurality of second phase terminals,
- first curvature centers of the plurality of first phase terminals are disposed to be different,
- second curvature centers of the plurality of second phase terminals are disposed to be different, and
- a position of a curvature center of the first neutral terminal is the same as a position of a curvature center of the second neutral terminal,
- wherein each of the first phase terminals and the second phase terminals includes:
  - a body; and
  - protruding portions bent from the body in a radial direction with respect to the curvature center of the first neutral terminal, wherein, when viewed in an axial direction:
- any one of the protruding portions disposed on any one of the plurality of first phase terminals is disposed between one side end portion of the first neutral terminal and one side end portion of the second neutral terminal; and
- any one of the protruding portions disposed on any one of the plurality of second phase terminals is disposed between the other side end portion of the first neutral terminal and the other side end portion of the second neutral terminal.

* * * * *